L. W. DILWEG.
AUTOMOBILE BUMPER.
APPLICATION FILED FEB. 9, 1920.
1,340,867. Patented May 18, 1920.
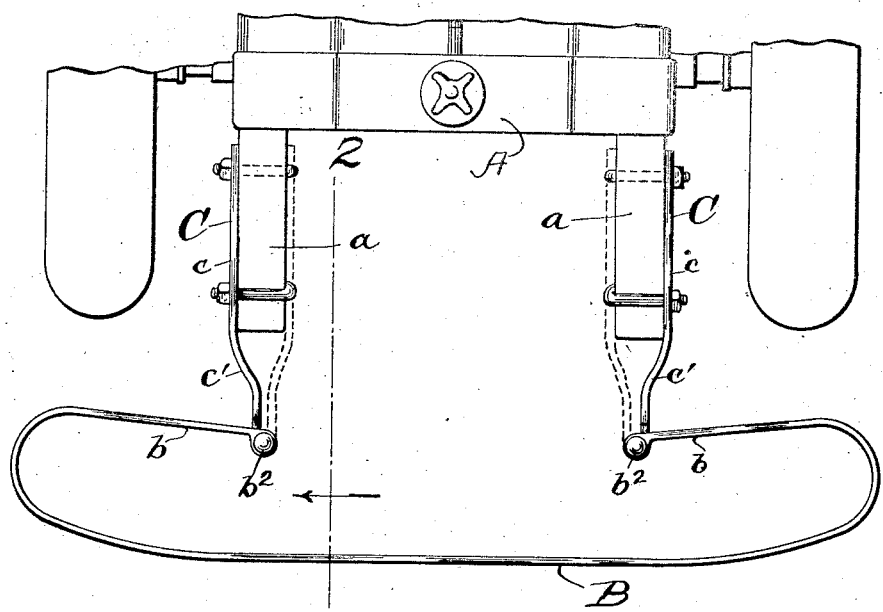
FIG. 1.
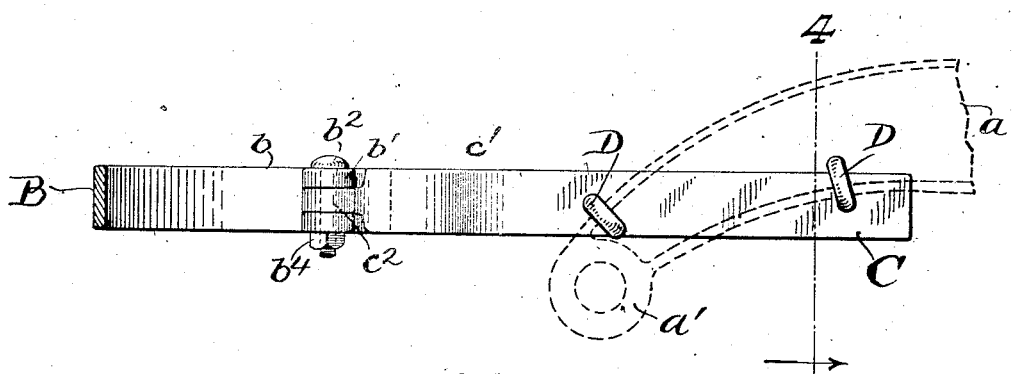
FIG. 2.
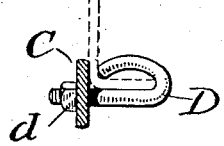
FIG. 4.
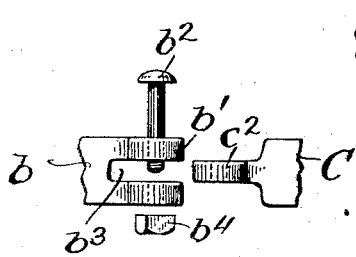
FIG. 3.
FIG. 5.
INVENTOR:
Lloyd W. Dilweg.
BY
WITNESS:
ATTORNEYS.

UNITED STATES PATENT OFFICE.

LLOYD W. DILWEG, OF MILWAUKEE, WISCONSIN.

AUTOMOBILE-BUMPER.

1,340,867.

Specification of Letters Patent. Patented May 18, 1920.

Application filed February 9, 1920. Serial No. 357,214.

*To all whom it may concern:*

Be it known that I, LLOYD W. DILWEG, a citizen of the United States, and a resident of the city of Milwaukee, in the county of Milwaukee and State of Wisconsin, have invented a certain new and useful Improvement in Automobile-Bumpers; and I do declare the following to be a full, clear, and exact description thereof, such as will enable others skilled in the art to which the invention relates to make and use the same, reference being had to the accompanying drawing as an illustration of one form in which my invention has been embodied.

The invention relates to bumpers or buffers for use in connection with automobiles or other motor vehicles.

The invention is embodied in an automobile bumper of simple yet efficient type, and which may be manufactured at a comparatively low cost.

The invention embodies a construction which will admit of easy application to the side frame bars of an automobile, in such position as to absorb the shock of the impact with another vehicle or other object, and thus prevent injury to the automobile to which the bumper is attached.

The invention also comprises provisions by means of which the bumper may be readily applied to automobiles having frames of different widths.

The attaching means referred to constitute the connections between the bumper and the side bars of the automobile, and such connections are constructed so as to be reversible, in order to admit of their more ready application to frames of different widths. These connections are provided at their forward end with eye pieces by means of which they are attached to the bumper. In the rear of the eye pieces, the connections are offset slightly and are then extended rearwardly in parallel planes. The parallel portions are clamped to the side bars of the automobile frame, and through the provisions for reversing the said connections, the distance between such parallel portions may be varied within reasonable limits, whereby the bumper may be attached to frames of different widths without structural changes or other adjustments.

In the drawings which form a part of this specification,

Figure 1 is a conventional showing in a plan view of the forward portion of an automobile, having my improved bumper attached to the front ends of the side bars of the frame thereof.

Fig. 2 is a view in elevation on the line 2—2, Fig. 1 looking in the direction of the arrow, and showing the manner in which the connection unites the bumper to the front end of a side bar.

Fig. 3 shows in detail the formation of the parts by means of which the connection with the bumper is established.

Fig. 4 is a detail showing the manner of attaching the bumper connection to the side bar of an automobile, such view being taken upon the line 4—4 Fig. 2 looking in the direction of the arrow; and Fig. 5 is a fragmentary view in elevation of the rear end of one of the connecting members.

Figs. 2, 3, 4 and 5 are drawn to the same scale.

Like reference characters are employed to designate the same parts in all of the views.

In the drawings, the letter A indicates the front end of an automobile of usual construction, the side bars of which are indicated $a$. These side bars are formed as channel bars, and in the construction typified, are curved downwardly at their front ends, and receive the usual spring hangers $a^1$.

The bumper B is formed from a strip of spring metal of suitable width. The thickness of the strip from which the bumper is formed will be such that there will be present a degree of resiliency which will be sufficient to absorb the force of the impacts of the nature ordinarily encountered, and thus prevent the shock from being transmitted to the automobile. The ends of the strip from which the bumper is formed are turned into the open loops, and the ends thereof lie substantially parallel to the axis of the bumper, such ends being indicated $b$. An eye $b^1$ is formed in each extremity of the bumper strip, and through each of the eyes a bolt $b^2$ passes, for a purpose hereinafter described. The eye portion is slotted horizontally as indicated at $b^3$.

The connecting members C are provided with straight portions $c$, slightly offset near their forward ends as at $c^1$. The front end of each connecting member C is reduced as at $c^2$, to the width of the slot $b^3$, in the end of the bumper, and such reduced portion of the connecting member is provided with an eye, through which the bolt $b^2$ passes, to unite the bumper and the connecting members C. A nut $b^4$ applied to the lower end of the bolt, serves to maintain the connection, and by tightening the nut the connection between the parts at this point may be rigid. In Fig. 2, the separated parts shown in Fig. 3, are assembled.

The straight portions of the connecting members C are perforated as at $c^3$ and $c^4$, and through these perforations hooked clamping bolts D pass, to unite the connecting members C to the side bars $a$. As indicated in Fig. 4, the end of the hook is seated in the angle of the channel bar, and the neck of the hook engages the edge of one of the flanges of the said bar. As indicated in Fig. 2, the front hook D engages the upper flange of the channel bar, while the rear hook engages the lower flange. By tightening the nuts $d$ on the said hooked clamping bolts, the connecting member C will be held rigidly and immovably against the side of the channel bar. It will be observed that the perforations $c^3$ and $c^4$ are shown in Fig. 5 as of different diameters, the purpose of this construction being to provide for the use of a hooked clamping bolt of larger diameter at the front end of the side bar, inasmuch as the greatest strain, in case of impact, is imposed upon the connection at this point. Conversely, a hooked clamping bolt of smaller diameter will meet the requirements of the connection at the rear end of the clamping member.

I have hereinbefore referred to the connecting members C as being reversible, so as to permit of their ready application to automobile frames of different widths. In Fig. 1 I have illustrated in dotted lines the relative position of the clamping members when reversed, so that the idea of the range within which adjustment can be made will be understood. This reversal of the position of the connecting members C, is accomplished by withdrawing the bolt $b^2$, giving the connecting members a one half turn, and restoring the bolt $b^2$. The perforations $c^3$ and $c^4$ are made in the central line of the connection C so that the hooked clamping bolts occupy the same position with relation to the clamping members, whether in their extreme or mean position.

My construction enables a quick adjustment of the connections between the bumper and the side bars of an automobile frame to be made, without the use of any of the complex provisions for effecting similar adjustments as in the bumpers now in general use. As already stated, an efficient bumper is produced at a minimum manufacturing cost, and may be applied with a great economy of time and labor.

The inherent elasticity existing in the bumper in the direction of its length will compensate for minor variations, and permit the connecting points $b^2$ to approach or recede from each other as the connecting members C are clamped to the side bars of the automobile.

Reasonable variations in the construction shown may be made without departing from the spirit of my invention.

Having thus described my invention, what I claim and desire to secure by Letters Patent of the United States, is:

1. A spring bumper for automobiles, comprising a bumper bar formed from a single strip of resilient metal and having its end portions turned back into open loops, the turned ends of the bar lying in a plane substantially parallel to the axis of the bumper portion of the bar, and reversible connecting members uniting the ends of the bumper bar to the automobile frame.

2. A bumper for attachment to the side bars of an automobile frame, such bumper being formed from a single strip of resilient metal, and having its end portions turned back into open loops, the turned ends lying in a plane substantially parallel to the axial line of the bumper, the extremities of the bumper being provided with eyes, connecting members having eyes at their forward ends, bolts uniting the ends of the bumper and the connecting members by passing through the eyes therein, and means for attaching the connecting members to the side bars of the automobile frame.

3. A bumper for automobiles, comprising a bumper bar formed of a single strip of resilient metal, and having its end portions turned back into open loops, the turned ends lying in a plane substantially parallel to the axial line of the bumper, the extremities of the bumper being provided with eyes, reversible members for connecting the bumper to the side bars of an automobile frame, said members having straight portions adapted to be clamped to the said side bars, and offset their forward ends which latter are provided with eyes, and bolts passing through the eyes to unite the parts.

4. The combination of the side bars of an automobile frame, with reversible bumper connections having straight portions adapted to be clamped to the said side bars, and offset near their front ends, said reversible connections being provided with eyes at their front ends, and a bumper formed from a single strip of resilient material, the ends of which are provided with eyes, with bolts passing through the eyes to unite the bumper to the connections.

5. An adjustable bumper connection for automobile frames of different widths, comprising reversible connections and provisions for clamping them to the side bars of an automobile frame, a bumper formed from a single strip of resilient material, the end portions of which are bent into open loops which lie parallel to the axial line of the bumper bar, and which end portions have eyes in their extremities, said reversible connections having offset portions and eyes which register with the eyes in the ends of the bumper bar, and bolts passing through the eyes to connect the bumper to the reversible connections.

6. Connecting members for attachment to the side bars of an automobile frame, said members being offset near and provided with eyes at their front ends, in combination with a bumper formed from a single strip of resilient material, the end portions of which are bent back to form open loops which lie in a plane substantially parallel to the axial line of the bumper bar, the extremities thereof being provided with eyes, and detachable connections between the eyes of the bumper and of the connecting members to permit reversal of the side members for attachment to frames of different widths.

In testimony whereof I have signed my name at Milwaukee, this 19th day of January, 1920.

LLOYD W. DILWEG.

Witnesses:
W. F. WOOLARD,
A. R. WOOLFOLK, JR.